UNITED STATES PATENT OFFICE.

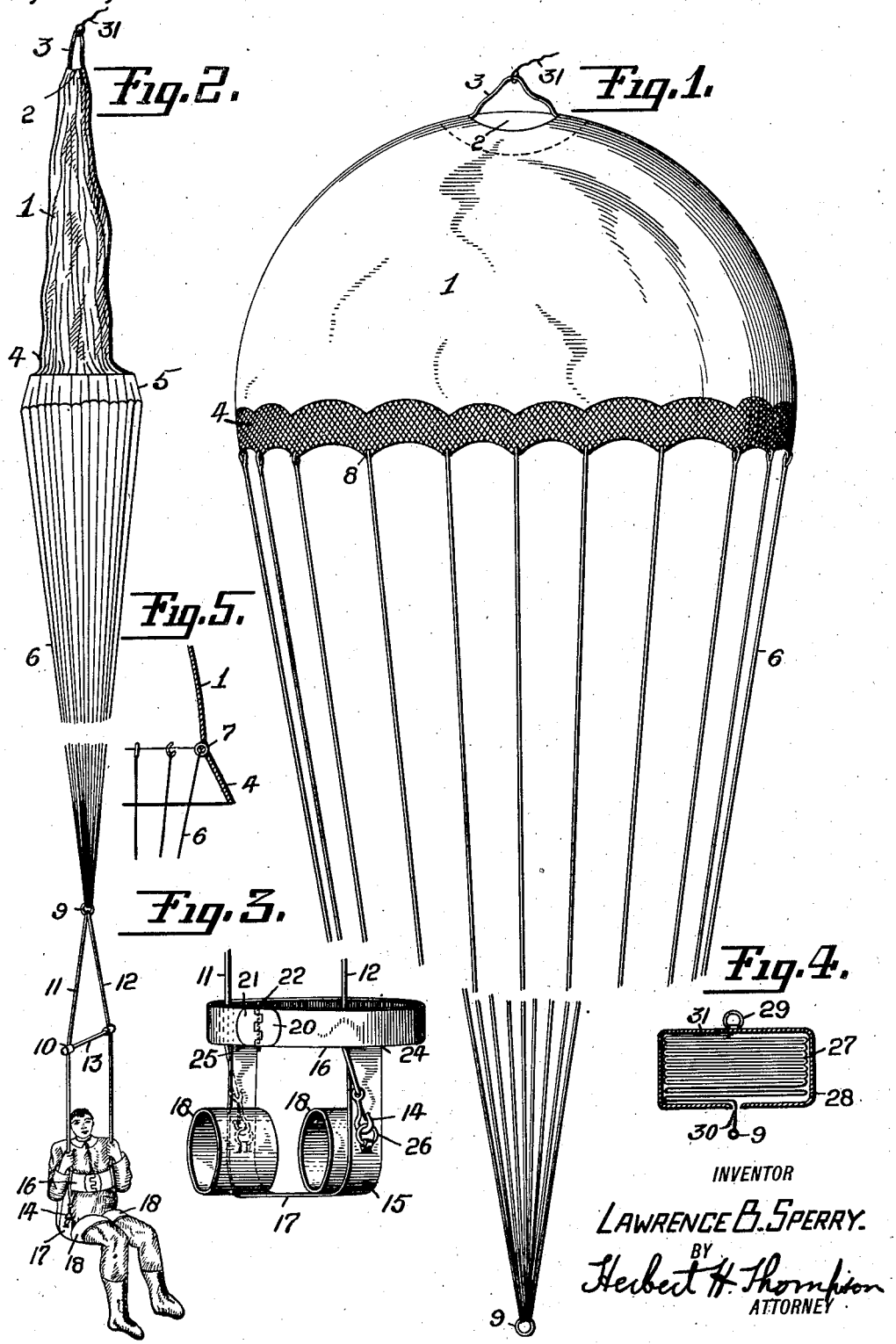

LAWRENCE BURST SPERRY, OF MASSAPEQUA, NEW YORK.

PARACHUTE AND SAFETY-BELT.

1,369,139.  Specification of Letters Patent.  Patented Feb. 22, 1921.

Application filed May 17, 1918. Serial No. 235,188.

*To all whom it may concern:*

Be it known that I, LAWRENCE B. SPERRY, a citizen of the United States of America, residing at Massapequa, L. I., in the county of Nassau and State of New York, have invented certain new and useful Improvements in Parachute and Safety-Belts, of which the following is a specification.

This invention relates to parachutes, and especially to parachutes adapted to the use of aviators in escaping from aeroplanes or other aerial craft.

One object of the invention is to provide a safety belt or support which may be easily put on, and which the aviator cannot fall out of.

Another object is to provide means for insuring the opening of the parachute when falling through the air.

Referring to the drawings wherein I have shown what I now consider to be the preferred form of my invention:

Figure 1 is a side elevation of a parachute in its open condition.

Fig. 2 is an elevation of the parachute just before opening.

Fig. 3 is a view of the safety belt or support.

Fig. 4 is a view showing a method of arranging the parachute to be placed on the aircraft.

Fig. 5 is a fragmentary detail showing possible points of attachment of the parachute ropes to the parachute body.

In the drawings, 1 represents the body or inflation portion of the parachute, having an opening 2 at its top and a cord 3 attached to the top. The lower edge of the body may comprise a strip 4 of comparatively stiff fabric which is preferably cut on the bias. The parachute ropes or cords 6 may be secured directly to the main part of the body 1 as at 7, Fig. 5, or to the strip 4 as at 8, Fig. 1. All of the cords 6 are shown as terminating in a ring 9, to which may be fastened a sling 10, shown as comprising a pair of ropes or straps 11 and 12 spread by a member 13. Any suitable means such as snap hooks 14 may be provided on the straps 11 and 12 for attachment to a support 15 adapted to be secured to the body of the aviator.

The said support 15 may comprise a belt 16, a seat portion 17 and a pair of looped members 18 adapted to serve as straps to fit around the legs of the aviator. The belt 16 is preferably provided with a suitable quick locking means, which may comprise a pair of interfitting members 20 and 21, each fastened to one of the ends of the belt and adapted to be locked together by a pin 22. The seat member 17 may comprise a strap of suitable width, fastened at its two ends 24 and 25 to the belt 16. The leg members 18 may be integral with or fastened to the seat strap 17, and while they may be provided with buckles for fastening them around the legs of the aviator, I have shown them as being completely closed. This necessitates stepping into the loops, but affords a saving of time which would otherwise be consumed in securing the buckles. It also lends a greater element of safety to the device by minimizing the number of parts to be fastened, thereby reducing the possibility of some of the parts being inadvertently or carelessly left unsecured. A pair of rings 26 may be provided on the support for attachment to hooks 14.

The aviator will of course wear the safety belt or support while occupying his place in the aircraft and should be prepared to jump quickly from the craft should occasion require. The parachute should therefore be so disposed that it will follow the aviator with minimum danger of being caught. To facilitate this, the parachute may be folded back and forth as at 27, Fig. 4, and placed within a bag or other container 28. A ring 29 is shown attached to the top of the bag for attaching the same to the aircraft. The bottom of the bag is shown as provided with a opening 30, large enough to pull the parachute through.

When the aviator jumps out of the craft, he will drag the parachute out from the bag. In order to cause the body portion of the phrachute to stream out as in Fig. 2 so as to facilitate its opening to the air instead of bundling up and falling unopened to the ground, I prefer to attach the cord 3 at the top of the parachute, to the top of the bag or to ring 29 by means of a light cord 31. This will hold the top part of the parachute back until the weight of the aviator exerts a sudden pull on the said cord 31 and breaks it. The position of the parachute and attached parts will then be as shown in Fig. 2.

The stiffness of the lower edge 4 of the parachute as well as the biased condition of the fabric will tend to cause the lower part to flare outwardly as shown at 5. This will cause air to enter the parachute and force it open.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a parachute, an inflation portion, a strip of diagonally cut fabric secured along the edge thereof and cords attached thereto.

2. In combination, a parachute, including an inflation portion, a strip of diagonally cut fabric secured along the edge thereof, a plurality of cords attached thereto and a belt member attached to said cords.

3. A device for suspending an aviator from a parachute, comprising a belt portion adapted to be placed around the waist of the aviator, means for locking said portion in closed position, a seat strap attached to said belt portion and a pair of looped members attached to said strap and adapted to fit around the legs of the aviator.

4. A device for suspending an aviator from a parachute, comprising a belt portion adapted to be placed around the waist of the aviator, means for locking said portion in closed position, a seat strap attached to said belt portion, and means for attaching said device to the strings of a parachute.

5. In a parachute, an inflation portion, a strip of diagonally cut stiff or coarse fabric secured along the edge thereof for tending to open said inflation portion and cords attached to said parachute.

6. In a parachute, an inflation portion, the edge of said portion comprising a strip of biasly cut fabric and a plurality of cords attached to said portion.

7. In a parachute, an inflation portion, an edge piece on said portion comprising a strip of biasly cut coarse fabric, a plurality of cords attached to said edge and a common attaching means on said cords.

In testimony whereof I have affixed my signature.

LAWRENCE BURST SPERRY.